Aug. 5, 1969    G. P. KLEIN    3,458,916
POWDER ON FOIL SOLID TANTALUM CAPACITOR
Original Filed Dec. 13, 1965    2 Sheets-Sheet 1

INVENTOR
GERHART P. KLEIN
BY
Charles W. Hoffmann
ATTORNEY

Aug. 5, 1969  G. P. KLEIN  3,458,916
POWDER ON FOIL SOLID TANTALUM CAPACITOR
Original Filed Dec. 13, 1965  2 Sheets-Sheet 2

INVENTOR
GERHART P. KLEIN
BY
Charles W. Hoffmann
ATTORNEY

United States Patent Office 3,458,916
Patented Aug. 5, 1969

3,458,916
POWDER ON FOIL SOLID TANTALUM
CAPACITOR
Gerhart P. Klein, Manchester, Mass., assignor to P. R.
Mallory & Co. Inc., Indianapolis, Ind., a corporation
of Delaware
Original application Dec. 13, 1965, Ser. No. 513,457, now
Patent No. 3,403,303, dated Sept. 24, 1968. Divided
and this application Mar. 1, 1968, Ser. No. 729,847
Int. Cl. H01g *13/00;* B22f *3/24*
U.S. Cl. 29—25.42                     20 Claims

ABSTRACT OF THE DISCLOSURE

An electrolytic device is made by producing a depressed portion in a body of film forming material, placing a moistened mass of particles of the same material in the depression and bonding the mass to the body while sintering the mass to form a porous body having an uninterrupted dielectric film in the unbonded areas.

---

This is a division of application Serial No. 513,457, filed December 13, 1965, now Patent No. 3,403,303.

The present invention relates to electrolytic capacitors and more particularly relates to a novel solid electrolytic tantalum capacitor.

It is well known that a solid electrolytic tantalum capacitor may be manufactured by the following method: A sintered porous tantalum slug, obtained by pressing and sintering tantalum powder, is anodized in an electrolyte such as phosphoric acid to form an oxide layer on the surface of the tantalum slug. A film of a semiconductor, such as manganese dioxide is closely attached to the oxide layer by dipping the anodized slugs in an aqueous solution of manganese nitrate, and converting the manganese nitrate to manganese dioxide by pyrolysis. The semiconductor layer is coated with a layer of an electrical conductor such as graphite and silver paint. The $MnO_2$/C/Ag serves as the cathode, and the tantalum metal serves as an anode of the solid electrolyte tantalum capacitor with the tantalum oxide film acting as the dielectric. After connecting electrical leads to the base metal (anode) and to the silver coating (cathode), the solid electrolyte capacitor is sealed in a metal case or is molded with a plastic resin.

There are increasing applications for small solid electrolyte tantalum capacitors which pose problems in handling and are even more susceptible to damage during processing than the larger units. It is known that the less the units are handled during production, the less likelihood there is of damaging them. Also pressing and the addition of binder are factors influencing the quality of capacitors.

It is an object of the present invention to provide a new process for manufacturing solid electrolyte tantalum capacitors.

It is an object of the present invention to provide a novel process for manufacturing a solid electrolyte tantalum capacitor which decreases the amount of handling of individual units during production, eliminates binder from the process and avoids pressing, thereby substantially improving the initial quality of the anodes and reducing damage during processing.

It is an object of the present invention to provide a novel process for manufacturing solid electrolyte tantalum capacitors wherein drops of tantalum powder are sintered onto tantalum foil, and the foil as a whole is processed until the final step wherein the individual capacitors are punched out and encapsulated.

It is a further object of the present invention to provide a simple means for measuring and dispensing the quantity of tantalum powder onto the tantalum foil.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention provides a new solid electrolyte tantalum capacitor. Controlled deposits of a tantalum powder slurry are deposited in small depressions or cups on tantalum foil, or onto flat foil. The powder deposits are sintered onto the foil in a high vacuum or an inert atmosphere at temperatures between 1900° C. and 2200° C. The foil, which may have any number of individual porous slugs, is processed in a manner such that, at the end of the process, the foil contains a plurality of individual capacitors which are then punched out and individually encapsulated.

The present invention provides a new type capacitor and its fabrication and discloses a novel process which eliminates a number of processing steps and reduces the amount of handling of individual units, resulting in a more efficient manufacture and improved electrical charatceristics. Operations such as mixing tantalum powder with a binder and pressing slugs therefrom, binder removal and pre- sintering, and welding lead wires to the slug prior to final sintering are eliminated. This greatly reduces the danger of contamination during these steps. This is important, as the quality of the raw pellets is largely responsible for the quality of the oxide film and therefore the capacitors. In addition, after the sintering process, the individual slugs are not as easily damaged by handling as under present manufacturing conditions. The new process further lends itself to mechanization more readily than present procedures.

The use of liquids to form a tantalum powder slurry does not introduce a new source of contamination, since the liquids may be either water, various alcohols, or other organic or inorganic liquids which are readily removed by drying, do not react with tantalum, and do not contaminate the tantalum after evaporation. The use of a slurry instead of a dry powder is necessary to obtain a smooth surface of the pellet, and also to obtain a uniformly dense pellet.

Figure 1:
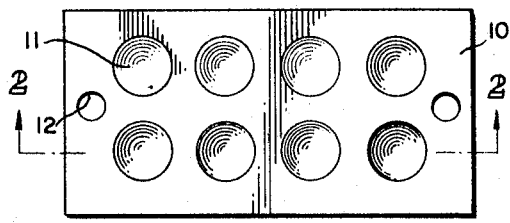
FIGURE 1 is a top view of the tantalum foil after the cups for containing the tantalum powder have been punched therein.
Figure 2:
FIGURE 2 is a section view of the punched foil taken through section 2—2 of FIGURE 1.
Figure 3:
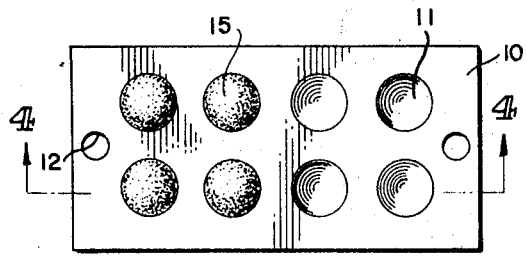
FIGURE 3 is a top view of the foil wherein part of the cups have been filled with a tantalum powder slurry.

Referring now to the drawings, annealed high purity tantalum foil 10 is cut in shapes suitable for processing. The dimensions are determined by the dimensions of the vacuum furnace to be used. In the preferred embodiment, cups 11 are pressed into the foil by using a suitable die which simultaneously cuts the foil into a suitable size, forms the cups and, if desired, prepunches the final unit outline. For illustrative purposes, 0.002 in. thick foil was cut to 1 x 1.5 in. Eight cups having 0.2 in. diameter, a depth of 0.1 in. were pressed into the foil, and positioning apertures 12 were punched therein. The separation between the individual cups is preferably at least ⅛ in. However, the foil area should be ultilized as fully as possible. FIGURE 2 clearly shows the depressed cups 11 in foil 10.

Figure 4:
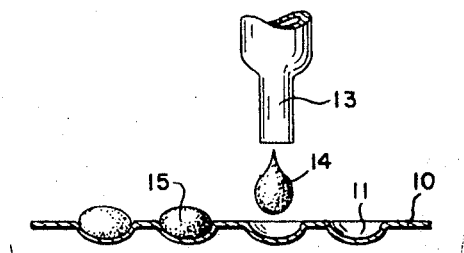
FIGURE 4 is a section view taken through section 4—4 of FIGURE 3.

After the initial foil prepartion, a slurry is formed by mixing tantalum powder in liquids such as distilled water, isopropyl alcohol, benzene, toluene, distilled water mixed with glycol, and the like. Liquids are selected on the basis of viscosity, surface tension and ease of removal from the powder. As an illustrative example of a slurry, 50 gms. of tantalum powder and about 20 mls. of water were transferred into a container and shaken until uniform dispersion was attained. The powder was dispensed drop by drop into each cup with a dispensing means 13 after the settling of the powder on the dropper tip, as shown in FIGURE 4. The size of each drop 14 is controlled so that a uniform amount of powder 15 is obtained in each cup.

Control of the drop size is attained by a number of factors. The dense tantalum powder settles to the bottom of the dispensing means. A vibrator means associated with the dispensing means assures free and uniform flow of tantalum powder in the capillary tube of dispensing means 13. The dropping rate is controlled by the amount of water feed into the dispensing means. Further factors are the diameter of the capillary tube, the surface tension of the liquid and the material of the tip of the dispensing means.

Either a wetting tip or a non-wetting tip may be utilized, however, a non-wetting tip from a material such as the plastic sold under the trademark Teflon is preferable for controlling the size of the drops. When Teflon is utilized, the drop is held only by the water column. As water tends to pull away from the inner surface of the capillary tube, it has been found best not to exceed a 0.1 in. diameter capillary tube. If a wetting surface such as glass is utilized, the drop would be larger as the drop adheres to and spreads on the bottom surface of the material. While there is no limitation on the diameter of the capillary tube when glass is utilized, the glass must be kept free from contamination, and the outside wall of the dispensing tip must be coated with a non-wetting material to prevent the spreading of the drop up the sides, as this yields irregular drops. When a material such as Teflon is used, a dispensing means having a plurality of capillary tubes therein may be utilized to obtain multiple weight drops, thus overcoming the diameter limitation, and facilitating the desired amount of powder to be dispensed in one operation.

The dispensing of the powder may be carried out to obtain either relatively wet or relatively dry drops. The control of the water/powder ratio depends upon the length of the capillary tube. The longer the tube, the higher the water content. It has been found that lengths of from about 5 mm. to about 20 mm. which yield from about 8% to 15% by weight of water per drop are preferable, although not limiting. If relatively dry drops are dispensed, it is necessary to vibrate the foil to obtain spreading of the drop. A wet drop spreads by itself.

The dispensing of powder drops is a simple way of measuring the quantitiy tantalum powder, and particularly for measuring small amounts of the powder, such as 10 mg. amounts.

The foils 10 are dried after the dispensing of the powder slurry to remove the excess liquid. A slight amount of solvent is desirable to keep the powder drops in shape until the foils have been transferred to the sintering furnace. Sintering was carried out in a vacuum furnace at a temperature between 1900° C. and 2200° C. from about 30 minutes to about 2 hours. The foil and pellets are anodized, washed and dried prior to the application and pyrolysis of $Mn(NO_3)_2$, and the application of graphite silver counter electrode layers. After anodization, the foils are washed in distilled water and dried.

Figure 5:
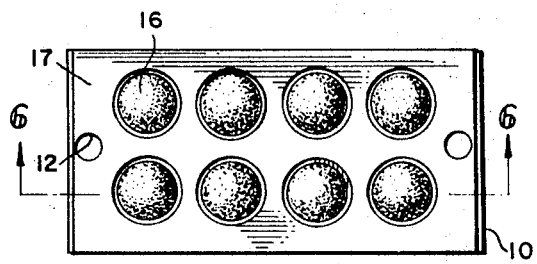
FIGURE 5 is a top view of the foil after the tantalum powder has been sintered and anodized and an insulating coating has been applied about the sintered, anodized slugs to prevent spreading of the $MnO_2$.
Figure 6:
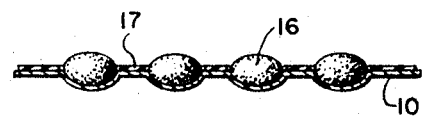
FIGURE 6 is a section view of the formed and insulated units taken through section 6—6 of FIGURE 5.
Figure 7:
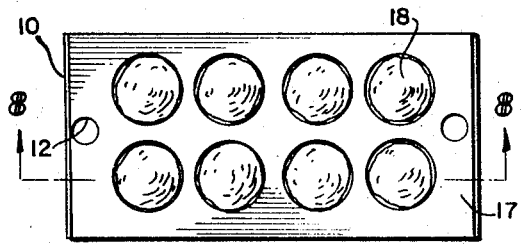
FIGURE 7 is a top view of the units after the application of $NnO_2$, graphite and silver layers.
Figure 8:
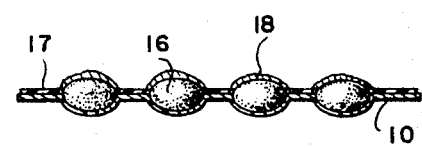
FIGURE 8 is a section view taken through section 8—8 of FIGURE 7.
Figure 9:
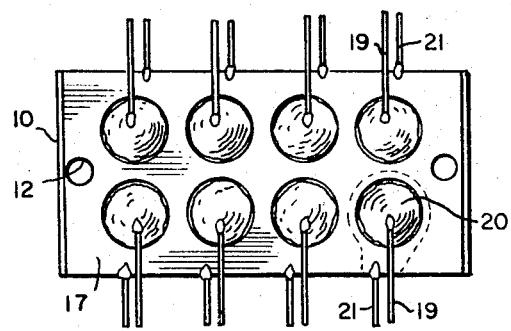
FIGURE 9 is a top view of the units after lead attachment but prior to separating the units by suitable punching or cutting techniques.

Referring now to FIGURES 5 and 6, the area between porous sintered pellets 16 is masked with a suitable masking material 17 such as a silicon rubber or heat resistant varnish to prevent the spreading of $Mn(NO_3)_2$ solution. The foils are then re-anodized. This step provides better wetting by the $Mn(NO_3)_2$ which must be applied. The foils are then impregnated with $Mn(NO_3)_2$ solution and pyrolyzed at temperatures between 200 and 400° C. FIGURES 7 and 8 show the build up of $MnO_2$ on the anodized, sintered pellets 16. Contact is then made to the $MnO_2$ by using colloidal graphite and silver paint following standard procedures. Negative lead wires 19 are welded to the foil 10 as close to pellets 16 (FIGURE 5) as possible.

Figures 10, 11:
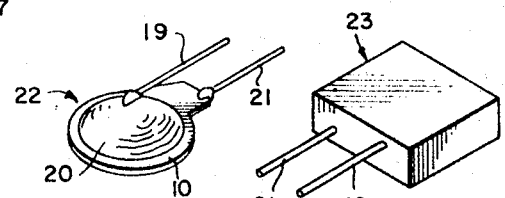
FIGURE 10 is a pictoral view of a completed unit after punching said unit from the foil.
FIGURE 11 is a pictorial view of an encapsulated unit.

Completed capacitor unit 22 (FIGURE 10) is stamped from foil 10 and the individual units are encapsulated by suitable methods, as illustrated in FIGURE 11 which shows an encapsulated capacitor 23.

Figure 12:
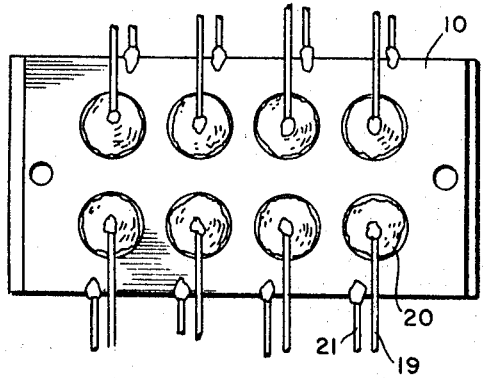
FIGURE 12 is a top view of units constructed on flat tantalum foil.
Figure 13:
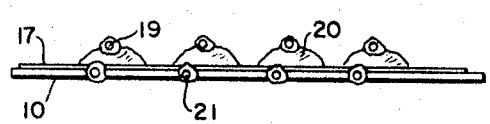
FIGURE 13 is a side view of the units constructed on flat foil.
Figure 14:
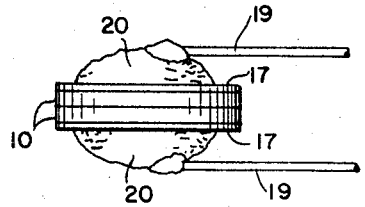
FIGURE 14 is a side view of two capacitors formed on the flat foil, prior to encapsulation to provide a capacitance unit.

The capacitors may be fabricated by dispersing the tantalum powder onto flat foil 10 as shown in FIGURES 12 and 13, as cups 11 aid in defining the shape of the dispensed powder 15. While the surface tension of the drops must be closely controlled in this embodiment, the capacitors lend themselves to multiple capacitor units as shown in FIGURE 14.

Figure 15:
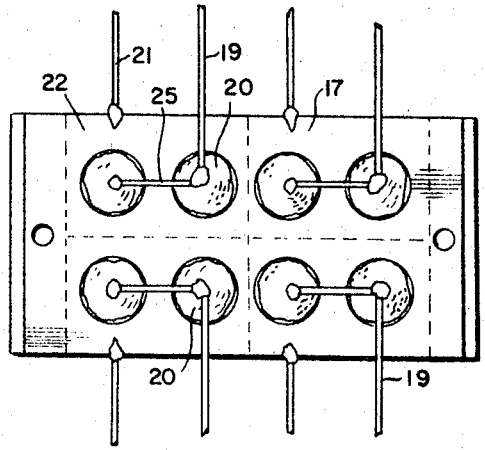
FIGURE 15 is a top view of the completed units illustrating that a plurality of capacitors may be interconnected prior to cutting and encapsulation or other sealing means.

Whether the cups or flat foil is utilized, multiple units may also be obtained as shown in FIGURE 15. The cathodes 20 of individual capacitors 22 are interconnected by lead 21. External lead 19 is connected thereto, and lead 21 is connected to foil 10 prior to cutting and packaging.

Capacitors produced by the present invention are similar in characteristics to those produced by standard techniques. The main difference lies in the simplification of the processing techniques which are particularly advantageous for small units which are difficult and expensive to handle. However, there is no limit as to size of capacitors that can be manufactured by the new technique. The elimination of steps that are known to introduce impurities and mechanical damage during processing further makes the new process particularly suitable for the development of higher voltage capacitors.

The punching of reference notches, dimpling of foil, pre-punching and cutting are accomplished in a single operation. By merely filling the cups or dimples with a predetermined amount of the powder slurry prior to drying and sintering, which may be accomplished in the same furnace, the necessity of mixing the powder with a binder and pressing to form a slug, etc., are eliminated and the process is simplified. The present invention further applies to materials such as niobium, aluminum, titanium, silicon and the like.

While there has been illustrated and described what is at present considered to be preferred embodiments of the present invention and a method of making the same, it will be appreciated that numerous changes and modifications are likely to occur to those skilled in the art, and it is intended in the appended claims to cover all those changes and modifications which fall within the true spirit and scope of the present invention.

I claim:
1. A method of making an electrical capacitor comprising the steps of:
   (a) dispensing controlled deposits of a film forming metal powder into a plurality of depressed means in a foil of film forming metal for defining the shape of and supporting said deposits;
   (b) sintering said deposits onto said foil thereby providing a plurality of spaced apart sintered porous pellets on said foil, said foil and said pellets providing a plurality of anodes;
   (c) anodizing said foil and said pellets;
   (d) masking the foil between said pellets;
   (e) applying a manganese nitrate solution to said pellets, and converting said manganese nitrate to manganese dioxide;
   (f) applying a layer of graphite to said manganese dioxide layer, and a layer of silver to said graphite layer, thereby providing a cathode;
   (g) attaching a cathode lead wire to each of said cathodes and an anode lead wire for each corresponding cathode to said foil adjacent said cathode;
   (h) separating each of the resulting capacitors by a means for cutting said capacitors from said foil; and
   (i) providing a housing means for each of said capacitors.

2. The method of making an electrical capacitor of claim 1 wherein the film forming metal is selected from the group consisting of tantalum, aluminum, niobium, silicon and titanium.

3. The method of making an electrical capacitor of claim 2 wherein the film forming metal is tantalum.

4. The method of making an electrical capacitor of claim 3 wherein said sintering is carried on from about 30 minutes to about 2 hours at 1900° C. to 2200° C.

5. The method of making an electrical capacitor of claim 4 wherein a perforated capacitor outline is precut about each of said depressions prior to said dispensing step.

6. The method of making an electrical capacitor of claim 5 wherein said controlled deposits are deposited onto flat foil.

7. The method of making an electrical capacitor of claim 6 wherein a plurality of cathodes are interconnected so as to provide a nonpolar capacitor unit.

8. The method of making an electrical capacitor of claim 5 wherein a plurality of cathodes are interconnected so as to provide a multiplication of capacitance.

9. In the manufacturing of electrical capacitors, a method for making anodes suitable for use in said capacitors which comprises the steps of
   providing a sheet of a film-forming metal having separate areas thereof associated each with one of said capacitors,
   depositing at least one separate moistened mass of a powder of said metal on said sheet within each area, and
   sintering each mass of powder in situ to said sheeet to convert it to a porous pellet of said metal and securely connect it with said sheet so that it constitutes together with its associated area of said sheet the anode for one of said capacitors.

10. The method of claim 16 which further comprises forming depressions in said sheet within each separate area prior to depositing the metal powder thereon, the metal powder thereafter being deposited in said depressions.

11. The method of claim 9 which further comprises perforating said sheet to define the respective separate areas thereof prior to depositing the metal powder thereon.

12. The method of claim 9 wherein the metal powder is deposited on said sheet by dispensing controlled amounts thereof from a slurry of said powder.

13. A method for making electrical capacitors which comprises the steps of
   anodizing the sheet of film-forming metal and each of the porous pellets sintered to said sheet in accordance with the method of claim 9 to form a dielectric oxide coating of said metal on the surfaces of said sheet and said pellets,
   applying separate cathode layers over each of said porous pellets,
   attaching a connector lead to each of said cathode layers, and
   attaching a separate connector lead to the sheet area associated with each porous pellet.

14. The method of claim 13 which further comprises separating each of the respective areas of said sheet from the others.

15. The method of claim 13 wherein the cathode layers are applied to each pellet by
   first forming a coating of a solid electrolyte over the dielectric oxide coating,
   thereafter applying a coating of graphite over the solid electrolyte, and
   then applying a metallic coating over the graphite.

16. The method of claim 15, wherein an electrically nonconductive masking material is applied over each of said areas of said sheet other than the portions juxtaposed with said porous pellets prior to forming the coating of solid electrolyte on each pellet.

17. The method of claim 9 which further comprises anodizing said foil and said mass of powder,
   applying a semiconductor coating to said mass of powder,
   applying a cathode layer to said semiconductor coatings, thereby providing a plurality of cathodes,
   attaching a cathode lead wire to each of said cathodes and an anode lead wire for each corresponding cathode to said foil adjacent said cathode,
   separating each of the resulting capacitors by a means for cutting said capacitors from said foil, and
   providing a housing means for each of said capacitors.

18. The method of claim 17, wherein the film-forming metal is selected from the group consisting of tantalum, aluminum, niobium, silicon and titanium.

19. The method of claim 17, wherein the film-forming metal is tantalum.

20. The method of claim 19, wherein said sintering is carried on at a temperature of about 1900° C. to about 2200° C.

References Cited
UNITED STATES PATENTS

| | | | |
|---|---|---|---|
| 1,517,370 | 12/1924 | Marbury | 29—25.42 |
| 1,533,611 | 4/1925 | Respess | 29—25.42 |
| 2,290,338 | 7/1942 | Koehring | 317—230 |
| 2,406,345 | 8/1946 | Bremnan | 317—230 |
| 2,582,744 | 1/1952 | Brennan | 317—230 |
| 2,733,389 | 1/1956 | Ellison | 317—230 |
| 2,743,400 | 4/1956 | Bujan | 317—230 |
| 2,953,840 | 9/1960 | Freeburg | 29—25.42 |
| 3,093,883 | 6/1963 | Haring et al. | 29—25.42 |

PAUL M. COHEN, Primary Examiner

U.S. Cl. X.R.

29—420